US00RE36530E

United States Patent [19]

Heller et al.

[11] E Patent Number: Re. 36,530

[45] Reissued Date of Patent: Jan. 25, 2000

[54] METHOD FOR RECEIVING AND TRANSMITTING OPTICAL DATA AND CONTROL INFORMATION TO AND FROM REMOTELY LOCATED RECEIVERS AND TRANSMITTERS IN AN OPTICAL LOCATOR SYSTEM

[75] Inventors: Alan C. Heller; Christopher W. Fox, both of Dallas, Tex.

[73] Assignee: Precision Tracking FM, Inc., Plano, Tex.

[21] Appl. No.: 08/797,534

[22] Filed: Feb. 7, 1997

Related U.S. Patent Documents

Reissue of:

[64] Patent No.: 5,387,993
Issued: Feb. 7, 1995
Appl. No.: 08/083,725
Filed: Jun. 25, 1993

[51] Int. Cl.[7] ..... H04B 10/00

[52] U.S. Cl. ..... 359/155; 359/144; 359/167; 359/172; 340/572; 340/825.49

[58] Field of Search ..... 359/144, 143, 359/152, 155, 164, 167, 172; 340/572, 825.49, 825.54, 573

[56] References Cited

U.S. PATENT DOCUMENTS

| | | | |
|---|---|---|---|
| 3,659,085 | 4/1972 | Potter et al. | 235/150.2 |
| 3,696,384 | 10/1972 | Lester | 340/317 |
| 3,739,329 | 6/1973 | Lester | 340/11 |
| 3,805,265 | 4/1974 | Lester | 340/6.5 R |
| 4,121,102 | 10/1978 | Wilson | 250/341 |
| 4,151,407 | 4/1979 | McBride | 250/199 |
| 4,209,787 | 6/1980 | Freeny | 343/112 |
| 4,275,385 | 6/1981 | White | 310/312 |
| 4,649,385 | 3/1987 | Aires et al. | 379/57 |
| 4,837,568 | 6/1989 | Snaper | 359/144 |
| 4,990,892 | 2/1991 | Guest et al. | 340/825.49 |
| 5,020,020 | 5/1991 | Pomfret et al. | 364/900 |
| 5,119,104 | 6/1992 | Heller | 342/465 |
| 5,138,548 | 8/1992 | Kienle | 395/425 |
| 5,166,545 | 11/1992 | Harrington | 307/272.3 |
| 5,266,925 | 11/1993 | Vercellotti et al. | 340/572 |
| 5,512,879 | 4/1996 | Stokes | 340/573 |
| 5,652,570 | 7/1997 | Lepkofker | 340/573 |
| 5,686,902 | 11/1997 | Reis et al. | 340/825.54 |

FOREIGN PATENT DOCUMENTS

| | | | |
|---|---|---|---|
| 2541020 | 8/1984 | France | 359/155 |

*Primary Examiner*—Knife-Michael Negash
*Attorney, Agent, or Firm*—Akin, Gump. Strauss, Hauer & Feld

[57] ABSTRACT

The method for receiving and transmitting optical data and control information to and from remotely located receivers and transmitters in an optical location system. Wherein, the locator system tracks and locates the position of a main object having an attached transceiver. This transceiver has stored in memory selected identifying information about the object to which the transceiver is attached. The selected identifying information was received by the transceiver over it's 1-wire interface from a touch memory.

28 Claims, 3 Drawing Sheets

OPTICAL LOCATION SYSTEM

A TAG ENGAGING A MEMORY DEVICE

METHOD FOR RECEIVING AND TRANSMITTING OPTICAL DATA AND CONTROL INFORMATION TO AND FROM REMOTELY LOCATED RECEIVERS AND TRANSMITTERS IN AN OPTICAL LOCATOR SYSTEM

Matter enclosed in heavy brackets [ ] appears in the original patent but forms no part of this reissue specification; matter printed in italics indicates the additions made by reissue.

FIELD OF THE INVENTION

The invention relates generally to a position locating system, in particular an optical locator system adapted for use in an environment subject to optical transmission interference. In greater particularity, the invention relates to a system that accomplishes position location using area detection receivers that receive optical transmissions from a remotely located transmitter. In even greater particularity, the invention relates to portable optical transmitters that receive encoded digital information and retransmits that information by optical means.

BACKGROUND OF THE INVENTION

Position or object location systems are finding increasing application in manufacturing and materials handling environment. For example, such systems have utility for factory automation, including such application as tool automation, process control, robotics, computer integrated manufacturing (CIM), and just in time (JIT) inventory control.

One approach to position location systems is to use transmitters, commonly known as TAGs, that are attached to objects to be tracked by an array of receivers in a tracking area. Those TAGs have stored information that is transmitted to the receivers in the position location system by radio, ultrasonic or optical communications, using various techniques for identifying object movement or location in the near range of a receiver.

Radio communications provide a high degree of accuracy and performance in the terms of range per watt hour and penetrability through opaque structures. However, a problem with radio communications in a typical business environment, which includes walls, windows and other fixed structures, is that for the frequency of interest (i.e., above 100 MHz), random reflections introduce interference and path distortions in TAG transmissions arriving at a given receiver. Moreover, in such an environment, the unpredictable continuation of transmissions through walls and other structures make signal strength only marginally useful for communicating distance and location information.

Ultrasonic systems for locating personnel may include a portable battery power transceiver that is periodically scanned and which responds to signals from remote transceiver locations throughout the area of interest. Since the transceiver awaits scanning, power consumption is continuous. Utilizing the scan response transmission format may result in transceivers not transmitting because they are in a dead zone, i.e., transceivers out of range of the scanning transceiver. This inability to receive signals during a scan cycle will result in a "temporary lost personnel" status being transmitted to the personnel locator system. Additionally, since the distance from the transceiver unit to the remote transceiver location is variable, the transceiver design must accommodate worse case transmission ranges at the expense of additional power requirements.

Another problem that exists with ultrasonic personnel locating systems is due to their susceptibility to heavy ultrasonic noise. In most factory applications, there is a heavy ultrasonic background noise that interferes with the operation of the ultrasonic personnel locating systems. Additionally, ultrasonic signals are easily reflected by walls, cabinets, furniture, etc. These reflected signals provide interference signals. Since ultrasonic signals travel only at the speed of sound, the longer propagation delay of the reflected signals produce a more troublesome interference signal.

Optical systems for locating personnel may include the use of infrared transmitters to communicate information from the transmitter TAG to an infrared receiver. This type of an optical locator system has its TAGs powered by a small battery and the user of that TAG manually activates the TAG when that person is within the range of a receiver in the optical locator system. This type of system will reduce the size of the TAG's power requirement in transmitting information. However, this approach usually results in the personnel locator system reporting the "temporary lost personnel" for users who have simply forgotten to turn on their TAG when entering a room that has a TAG receiver.

Accordingly, a need exists for a position location system that incorporates portable transmitters that are low powered, light weight, easy to use and have utility in an environment subject to the effects of unwanted transmission.

SUMMARY OF THE INVENTION

The present invention is a method for receiving and transmitting optical data and control information to and from remotely located receivers audio transmitters in an optical locator system. Also, the present invention does not rely on hard-wired, or permanently programmed information stored within any of its transmitters that provide the locator system with identifying information. Data and control information can readily be entered and changed using the present invention.

The present invention provides a means for transmitting data and control information contained in a plurality of information packages to an optical receiver in an optical locator system. In one embodiment of the present invention, the locator system will include objects to be located within a tracking area and a TAG transmitter that transmits at selected intervals. The TAG transmitter utilized in this embodiment comprises a battery operated computer controller having stored in its memory a plurality of information packets containing selected identifying information about an object or person that is attached to the TAG. Also, TAG transmissions include at least one unique identification means selected to he unique to each individual TAG.

In another embodiment of the present invention the optical locator system has all array of receivers capable of receiving optical information distributed within a desired tracking area. The tracking area further comprises a plurality of memory devices having encoded into their memory selected identifying information. This identifying information is dedicated to each memory device positioned in spaced relationship throughout the tracking area.

The TAG utilized in this embodiment of the present invention has a serial interface external to the TAG. Engaging the TAG's serial interface with the individually selected memory device automatically initiates a transmitting protocol requesting from the memory device the encoded identifying information to be transmitted along the TAG's serial interface. The TAG receives all data and/or control information from the memory device. The present invention may utilize any memory device that is capable of transmitting and receiving in a serial format. An example of one of many types of memory devices that can be employed by the present invention is disclosed in U.S. Pat. No. 5,166,545 to Harrington. The operation of that memory device, once it receives the transmitted protocol, is to form its data and control information into information packets and transmits them to the TAG. The TAG receives those information packets into its memory and then forms an uplink information package containing a plurality of information packets and other control information pertinent to the TAG's environment. The TAG will then transmit omni-directionally the uplink package to any and all receivers in the optical locator system.

Pertinent information as to the TAG's environment is not limited to, but may include, battery life and a transmission interval count. The data information desired to be transmitted is dependent on the memory device and the control information that is selected according to the requirements of the optical locating system.

The preferred embodiment of the present invention includes a TAG transceiver that is battery powered, computer controlled and has a serial interface externally attached to the TAG. The TAG's computer has stored in its memory a program that will command and control the transmitting and receiving of uplink and downlink information packages to and from an optical transceiver in an optical locator system. The TAG will also have a motion detector and the capability of receiving polling commands from the locator system. The TAG will have a visual indicator or information being either transmitted or received by the TAG. This visual indicator is not limited to a light indicator such as a light emitting diode (LED). In fact the TAG used in the preferred embodiment will transmit or receive information to and from the optical locating system whether or not the TAG has any type of visual indicator.

The TAG used in this particular embodiment has received from a memory device by way of its serial interface, at least one information packet containing selected identifying information for the optical locating system. The TAG has stored this selected information in its memory.

The TAG selects a maximum number of transmissions from the TAG to the optical system. The TAG then selects a time delay that restricts the transmissions from the TAG to the optical system to that selected maximum number. The TAG's sleep mode is then activated, thereby reducing the normal electrical power consumption by the TAG. The TAG selectively predetermines a terminal time interval for the sleep mode. The terminal time interval ranges up to 3600 seconds and commences when the TAG enters the sleep mode. The sleep mode is reactivated by the TAG when the selected time delay added to the total sleep mode time is greater than the selected terminal time interval, thereby the TAG returns the power level to its normal level. The TAG then forms an uplink information package containing the information packets and then the TAG will transmit that package to the optical locating system. If desired, the TAG will check the battery life and transmit that status along with the information package of the uplink transmission. Then the TAG activates the sleep mode until the next total sleep mode time plus selected time delay is greater than the selected terminal time interval.

In the preferred embodiment of the present invention the TAG selects a motion count to define the number of allowable motion detections or desired motion detections. The TAG activates the sleep anode, thereby reducing it's normal power consumption. The TAG will reactivate the sleep mode when motion is detected by the motion detector, thereby returning the power level of the TAG to normal. The TAG will select a wrappable transmission interval count defining the number of transmissions to the optical locator system. This particular count is wrappable and inclementable, i.e. if the counter normally counts from 1 to 9, the counter when reaching 9 will start over with 1. This type of counter is defined to be wrappable. The wrappable counter used in the present invention is not limited to a count or 1 to 9. In fact, any wrappable counter may be used with the present invention. Once the selection is made, the TAG will form an uplink information package containing at least one information packet, checked battery life and a transmission interval count. The TAG will then transmit the uplink information package to the optical locator system. The TAG will randomize a preselected time delay for offsetting the uplink transmission, thereby preventing interference from other TAGs within range of the transmitting TAG. The motion count is then decremented thereby reducing the number of allowable motion detections. The transmission interval count is then incremented thereby defining the next uplink transmission from the previous uplink transmission. The TAG will continue transmitting uplink packages at selected intervals as long as the motion count is true. When the motion count is false, the TAG will stop transmitting and activate the sleep mode, thereby reducing electrical power consumption by the TAG.

The preferred embodiment of the present invention also includes a method for transmitting data and control information to and from a plurality of TAGs by the optical locator system wherein each TAG has stored in its memory an encoded identifier unique to each TAG and a plurality of information packets received from a selected memory device containing selected identifying information for the optical locating system. The optical system transmits a polling protocol to all the TAGs within range of the transmitter. The TAG receives the protocol from the optical locator system and stores the received protocol in its memory. The TAG will identify a selected identity code from the protocol, identifying selected TAGs. Comparing the selected identity code with the stored encoded identity unique to the individual TAG will start the forming of an uplink information package containing information packets. When that comparison is true, the TAG will transmit the uplink package to the optical system.

A complete appreciation for the invention and many of the advantages thereof will be readily perceived as the same becomes better understood by reference to the following detailed description %%hen considered in connection with the following drawings.

DETAILED DESCRIPTION

Figure 1:
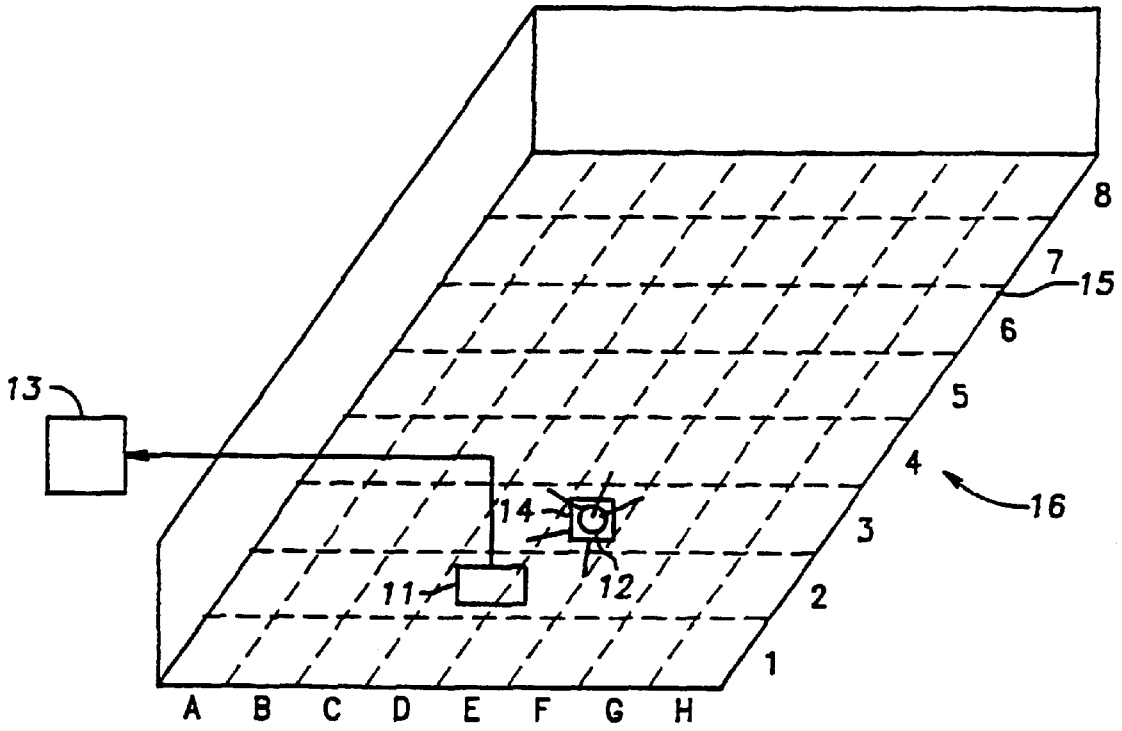
FIG. 1 illustrates an optical location system, a target, and an area in which the target is to be located.

An optical location system is generally shown at 16 in FIG. 1. That system comprises essentially of a transceiver 11 cooperating with processing station 13 and transceiver 12 which is attached to target 14. Albeit, the optical location system 16 is shown having only transceivers 11 and 12. The optical system may have a plurality of transceivers but for the purposes of this discussion the optical system will only have transceivers 11 and 12. If desired, transceivers 11 and/or 12 may be replaced by a separate receiver and transmitter contained in their respective packages. Transceiver 11 in conjunction with processing station 13 are used to locate target 14 moving within the defined area 15. For example, target 14 may be a box containing a work piece, such as a printed circuit board, which travels from one production station to another in a manufacturing plant during assembly. The system of FIG. 1 is a two-dimensional positional location system, in that the positioning is determined in terms of an X and Y coordinates of a plane parallel to the floor of the location area 15. In the above example description, area 15 may be represented as a grid of 64 sections, which in FIG. 1 are each identified by a letter A through H and the numerals 1 to 8. Target 14 is shown in section (E, 3).

Figure 2:
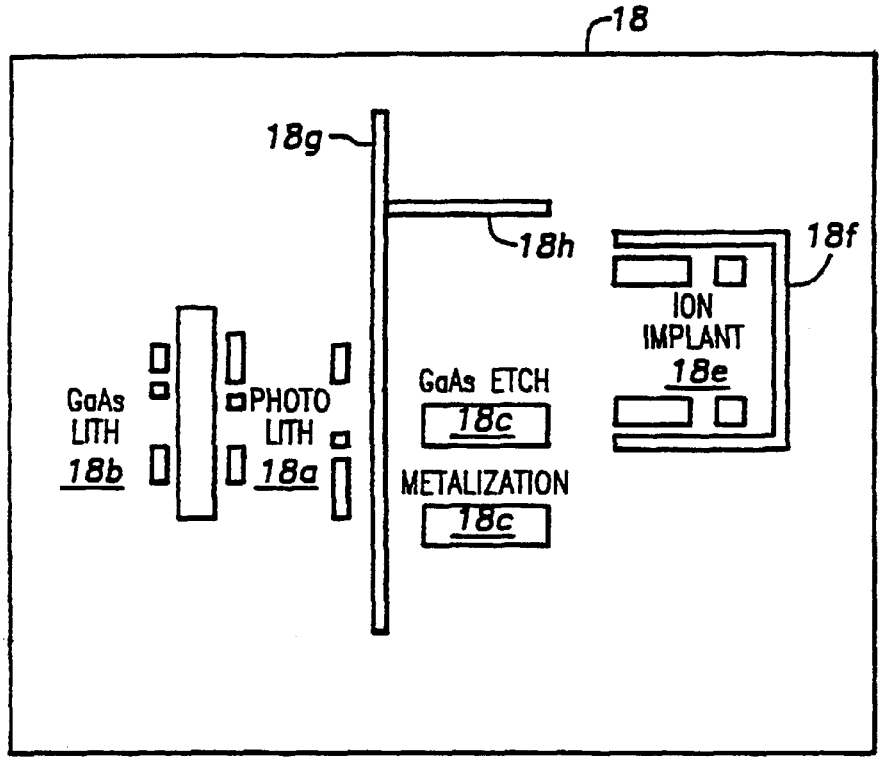
FIG. 2 illustrates a semiconductor fabrication facility as an environment containing wills and other fixed structures that cause interference and optical signal reflections.

The various components of a location system and its operation can best be understood by mentally overlaying FIG. 2 onto FIG. 1. FIG. 2 illustrates a semi-conductor fabrication facility 18 with numerous segregated areas, such as Photo LITH 18*a,* GaAs ETCH 18*c,* GaAs LITH 18*b* and ION implant 18*e* each enclosed by partitions and walls including 18*f,* 18*h* and 18*g*.

Figure 3:
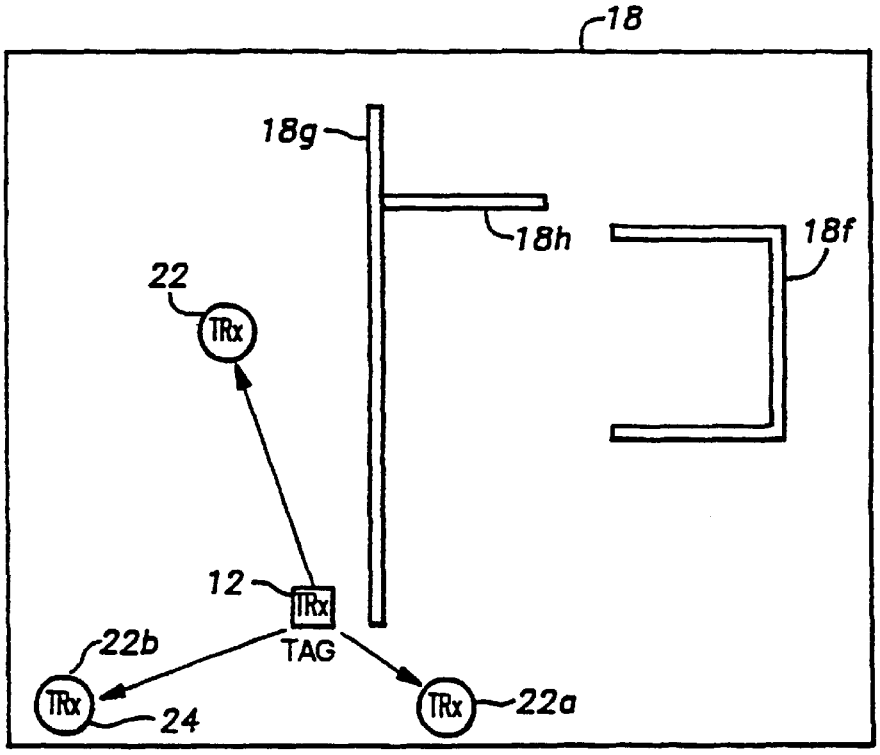
FIG. 3 illustrates the walls of FIG. 2 and a plurality of transceivers of the optical location system.

To further understand the operation of the present invention, mentally remove FIG. 2 from FIG. 1 and then overlay FIG. 3 onto FIG. 1.

FIG. 3 illustrates the same fabrication facilities shown in FIG. 2 with only walls 18*g,* 18*f* and 18*h* located within the facility along with transceivers 22, 22*a,* and 22*b* that are located in or adjacent to the ceiling.

Numerous objects move in the semi-conductor facility such as wafer boxes transported on conveyor systems. These objects must be tracked and their location identified to implement an efficient automated fabrication operation.

Attached to each object to be tracked is a TAG transceiver 12. Each TAG transceiver will transmits data and control information to the optical transceiver array 22, 22*a,* and 22*b* located in area 15. For example, target 14 is a box and to that box is attached a transceiver, TAG 12. Both box 14 and TAG 12 are located at (E,3) (FIG. 1). Transmissions from TAG 12 are received by at least optical transceivers 22, 22*a* and 22*b*. Each TAG transmission is an uplink package that includes selected identifying information and, if desired, battery life check.

Various components of a location system and its operation, are described in detail in U.S. Pat. No. 5,119,104 to Heller which is incorporated herein by reference. Although that description is in terms of radio transmissions, the same data coding and processing may be used for optical data transmissions. That patent describes both a time of arrival system and an area detection system. In the case of the latter system, different receivers are configured to detect transmissions from assigned areas within the location area. Location of a target is determined by which receiver or combinations of receivers detects the transmission from the TAG.

The present invention is distinguished from '104 patent by its ability to be reprogrammed with new identifying information from an external source through a 1-wire interface, commonly known as a touch memory device. The TAG of '104 patent is dedicated to an object or one individual in an optical locator system, whereas the TAG of the present invention may be rapidly reprogrammed with a new identity very quickly and without disassembly of the TAG.

Figure 4:
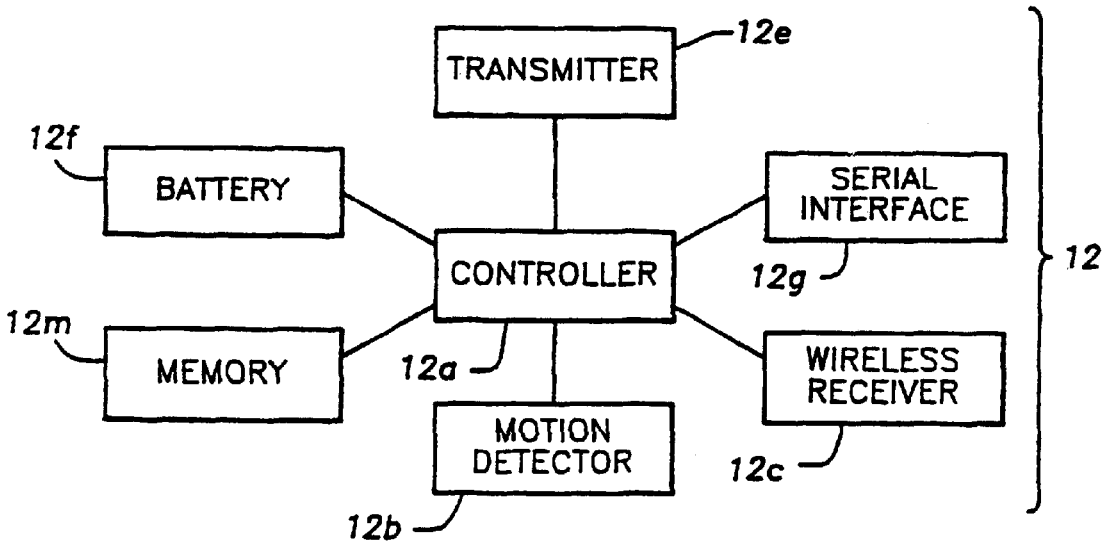
FIG. 4 illustrates a functional blocked diagram of a TAG transmitter and receiver.

The preferred embodiment of the present invention is generally shown at 12 of FIG. 4 which illustrates a functional block diagram or TAG 12. TAG 12 comprises a microprocessor based controller 12*a,* a motion detector 12*b,* a wireless receiver 12*c,* a serial interface 12*g,* a transmitter 12*e,* a battery 12*f* and a memory 12*m.* TAG 12 has stored in its memory 12*m* in an encoded identity code 27 (FIG. 10) that is unique to TAG 12, also stored are a plurality of information packets containing selected identifying information for the optical locating system.

Figure 8:
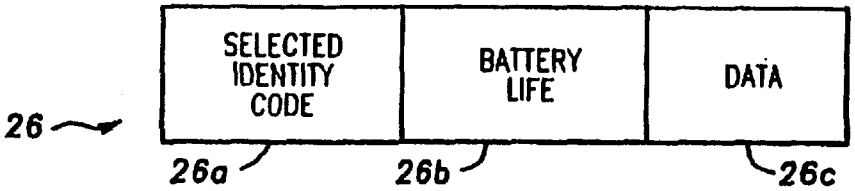
FIG. 8 illustrates an uplink information package.
Figure 9:
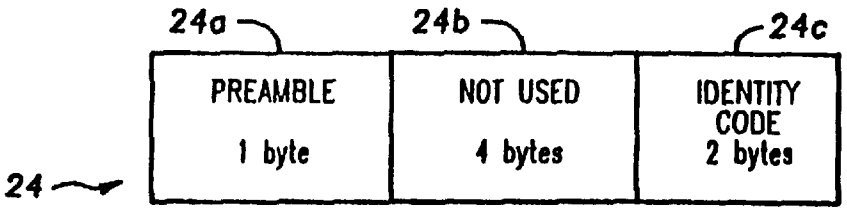
FIG. 9 illustrates a polling protocol transmitted by the optical system to all TAGS.
Figure 10:
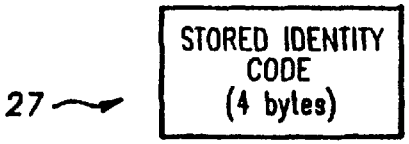
FIG. 10 illustrates a stored identity code dedicated to each individual TAG of the present optical system.

The stored identity code 27 of FIG. 10 may represent 4 bytes of information unique to one individual or object to be tracked within optical system 16. An example of this would be; byte-1 and byte-2 are the initials of an individual: and byte-3 and byte-4 arc numerical digits further identifying the individual. The stored identity code 27 is not limited to 4 bytes. The byte length is totally dependent on the requirements of optical system 16 and the memory capacity of memory device 20. Transceiver 11 of locator system 16 (FIG. 1) transmits a polling protocol 24 (FIG. 9) to all the TAGs within range of transceiver 11. TAG 12 receives the protocol 24 from the optical locator system 16 and stores protocol 24 in its memory. TAG 12's controller 12*a* will extract from protocol 24 the preamble 24*a*. Preamble 24*a* contains the order and priority of the control instructions from optical system 16 to all of its TAGs. Then controller 12*a* will identify a selected identity code 24*c* from protocol 24 that identifies selected TAGs. Controller 12*a* will then compare selected identity code 24*c* with the store encoded identity code 27, unique to TAG 12. If this comparison is true, controller 12*a* will form an uplink information package 26 (FIG. 8) that contains TAG 12's, identity code 26*a* (FIG. 8), battery life 26*b,* and selected information packets of binary data 26*c*. This uplink information package will be transmitted to optical system 16 at the next transmission interval.

Figure 5:
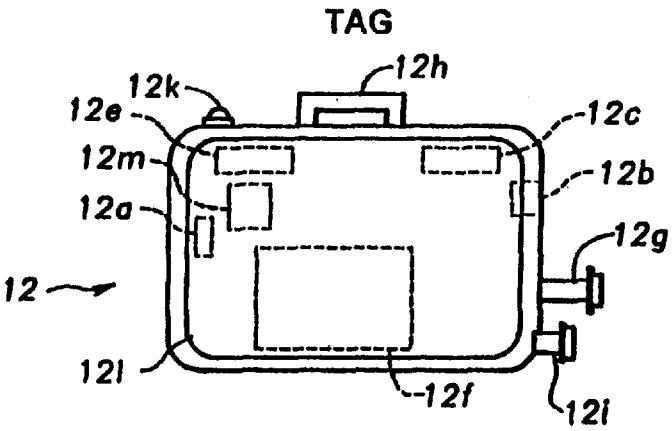
FIG. 5 illustrates a TAG in a plastic case that is transparent to infrared light.

TAG 12 of FIG. 5 is a domino size broadcast and receiving unit that has a black plastic case 12*l* that is transparent to infrared light. There are no controls or switches on TAG 12. Albeit push buttons, fuse blocks, and telemetry inputs could be added if desired. TAG 12 has a clothing clip 12*h*. This clip is optional, TAG 12 may, if desired, be permanently attached to any object. Also, TAG 12 has a visual indicator of information being transmitted or received by TAG 12. This visual indicator 12*k* is not limited to a light indicator such as a light emitting diode. In fact, TAG 12 used in this embodiment will transmit and receive information to and from optical locating system 16 whether or not the TAG has any type of visual indicator.

The individual electronic components making up TAG 12 are well known in the industry. Such as contained in the individual functional blocks 12*a,* 12*b,* 12*c,* 12*e,* 12*f,* 12*g* and 12*m* of FIG. 4. The present invention incorporates these function blocks into a package which is generally shown at 12 in FIG. 5. Wireless receiver 12*c* may be, if desired, left out of TAG 12 in systems that only require TAG 12 to transmit and not to receive information from optical system 16.

Figure 6:
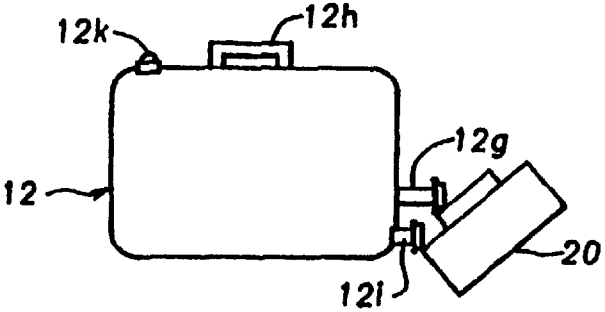
FIG. 6 illustrates a TAG engaging a memory device.

FIG. 6 is an environmental view of TAG 12 engaging memory device 20. Memory device 20 is of the type disclosed by U.S. Pat. No. 5,166,545 to Harrington, which is incorporated herein by reference. This particular memory device is a simple solution for storing and retrieving vital information with a minimum of hardware. Only serial interface 12*g* is required along with ground pin 12*i* for communications. Memory device 20 has stored in its memory, command and control information required by optical locator system 16. Memory device 20 (FIG. 6) may include but is not limited to a unique identification number, a real-time clock/calendar, an elapsed time clock, a cycle counter, a programmable interrupt and 4,096 bytes of static random access memory (SRAM). All of these features are available with or without power being applied to memory device 20.

Figure 7:
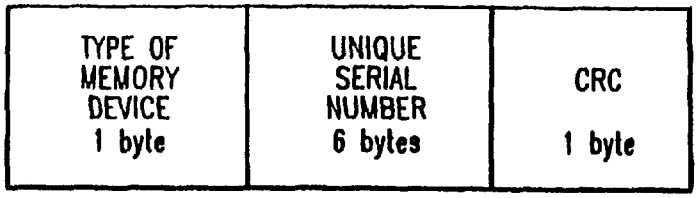
FIG. 7 illustrates a serial data byte pattern transmitted from the memory device to the TAG.

The following briefly describes the communications between TAG 12 and memory device 20. TAG 12 is engaging memory device 20 as shown in FIG. 6. All transmitting or receiving between TAG 12 and memory device 20 is along serial interface 12*g*. Memory device 20 used in this embodiment of the invention requires a strict protocol for accessing it's functions and data base, that protocol is to ensure the integrity of the data being transmitted along its one-wire interface. However, the present invention is not limited to this protocol, in fact, the present invention may be reprogrammed to accommodate any required protocol of any serial interface memory device. Therefore, TAG 12 generates a reset pulse that dears all previous commands of memory device 20. Memory device 20 then sends a presence pulse to acknowledge that reset has occurred and it is ready for a new command. An example to illustrate how memory device 20 and TAG 12 communicate: a typical command for a one-wire or serial communication is Read ROM Data. TAG 12 sends a command byte 33 Hex along serial interface 12*g;* after which it drives serial interface 12*g* to a low state for less than 15 microseconds. It then releases serial interface 12*g* and samples the interface condition (high or low level) at a time greater than 15 microseconds but less than 60 microseconds. If the voltage level on serial interface 12*g* is 60 high, the bit is a one. TAG 12 drives and samples serial interface 12*g* sixty-four times to complete the reading of the ROM Data. FIG. 7 illustrates a serial data byte pattern from memory device 20 to TAG 12. The first byte read by TAG 12 is the unique identity of the memory device 20. Since TAG 12 may operate with any memory device a code is required by TAG 12 identifying which memory device is transmitting to TAG 12. In this particular example, memory device 20 transmits the identity code 04 Hex to TAG 12. This process then begins again. TAG 12 sends a reset pulse and memory device 20 responds with a presence pulse. The next six bytes transmitted are the unique serial number of memory device 20. The next byte transmitted is the cyclic redundancy check (CRC) used to verify the transmitted data that is read last.

The typical operation of TAG 12 can best be understood by setting some typical pre-conditions for optical system 16. TAG 12 is attached to object 14 and object 14 is in a rest or quiescent state. This quiescent state enables TAG 12 to activate a sleep mode wherein the electrical power to TAG 12 is reduced to a minimum to conserve battery power. There is a software program stored within TAG 12's memory 12*m*. This software program commands and controls all of the functions of TAG 12. Therefore, TAG 12 and the software program are synonymous and both will be referred to as TAG 12. TAG 12 selects a maximum number of transmissions from TAG 12 to the optical locator system 16. TAG 12 then selects a time delay that restricts the transmission from TAG 12 to optical system 16 to that selected maximum number. This maximum number is variable and solely depends on the requirements of optical system 16. TAG 12 also selectively predetermines a terminal time interval for the sleep mode. The terminal time interval ranges up to 3600 seconds. Therefore, since TAG 12 is in the quiescent state, the sleep mode is activated and the sleep mode time interval commences, thereby reducing the power consumption of TAG 12.

A typical example of the requirements of optical system 16 would be a desire to transmit the identity code 26*a* unique TAG 12 to transceiver 11 every 10 seconds for 200 seconds. These transmissions would occur every time motion detector 12*b* FIG. 4 receives a disturbance to its quiescent state. Therefore, the selected motion count is 20, sleep mode terminal time is predetermined to be 300 seconds, the time delay is 200 seconds. A selectable internal maximum time counter, selected in this example to be 2.5 seconds, begins its count to 2.5 seconds. Therefore, every 2.5 seconds TAG 12 would reactivate the sleep mode thereby returning to normal power long enough to check the terminal time interval and determine if the total sleep mode time of TAG 12 added to the selected time delay of 200 seconds is greater that the selected terminal time interval of 300 seconds. If this condition is true than TAG 12 would begin transmitting uplink information package 26 containing identity cod 26, battery life 26*b* and data 26*c* to transceiver 11 it to second intervals for the next 200 seconds. When TAG 12 transmits uplink information package 26 to optical system 16, the transmission interval counter is incremented. This counter defines the number of transmissions from TAG 12 to optical system 16. Therefore, if desired, uplink information package 26 may contain the current number of transmissions in a given time period. Then TAG 12 will activate the sleep mode returning to the quiescent state. If the tested selected terminal time interval is false, TAG 12 will wait for motion detector 12*b* (FIG. 4) to detect a predetermined amount of motion and then TAG 12 will begin transmitting the same uplink information package as described above. With each transmission the motion count of 20 is decremented. TAG 12 will then activate the sleep mode returning to the quiescent state awaiting the next motion detection or the end of the terminal time interval.

An example to illustrate some of the operational features of the present invention: a person has TAG 12 (FIG. 5) attached to their clothing, such as a lapel of a man's jacket or a shirt pocket of a women's blouse. In both cases, TAG 12 would be attached to the clothing by clothing clip 12*a*. The person wearing TAG 12 will be tracked in the optical system 16 just as box 14 is tracked in optical system 16. This person had previously engaged TAG 12 with his or her own personal memory device such as memory device 20 (FIG. 6). That particular memory device contained all the information required by optical system 16 to identify the person who is attached to TAG 12. TAG 12 then transmits that information to the optical system 16 at selected intervals. Transceivers such as the aforementioned 22, 22*a* and 22*b* would receive TAG 12's transmissions and relay that information to the processing center 13 (FIG. 1). Processing center 13 will record the grid coordinates of TAG 12. In this particular scenario TAG 12 is moving about within optical system 16 and has no definite coordinates like box 14. This does not present a problem for optical system 16. Whenever TAG 12 enters or leaves a coordinate area of the optical system 16, that position is recorded by processing center 13.

The information of the exact location of TAG 12 is available to whomever desires that information. An example of that would be: the wearer of TAG 12 has an important long distance phone call waiting and the operator does not have visual contact with the wearer of TAG 12; the operator notes the present location of TAG 12 from the information gathered by processing center 13; the operator then transfers the incoming call to the closest phone to the wearer of TAG 12; and therefore, the wearer of TAG 12 receives the important phone call.

The invention now being fully described, it will be apparent to one of ordinary skill in the art that many changes and modifications can be made thereto without departing from the spirit or scope of the invention set forth herein.

I claim:

1. A method of transmitting data and control information contained in a plurality of information packages to an optical receiver in an optical locator system, comprising the following steps:

providing a motion detectable TAG having a memory and a serial data interface storing said data in said TAG's memory;

forming at least one information packet containing selected data and identifying information for the optical locator system;

selecting motion count defining the number of allowable motion detection;

activating a sleep mode of said TAG, thereby reducing the normal electrical power consumption of said TAG;

reactivating said sleep mode of said TAG when motion is detected by said motion detector, thereby returning the power level of said TAG to normal;

selecting an interval count defining the number of transmissions to the optical locator system;

forming an uplink information package containing said plurality of information packets, and said transmission interval count;

transmitting said uplink information package to said optical locator system;

decrementing said motion count, thereby reducing the definable number of allowable motion detection;

incrementing said transmission interval count;

forming a second uplink information package containing said plurality of information packets and said incremented transmission interval count;

retransmitting said second uplink package containing said incremented transmission interval count and said plurality of information packets when said decremented motion count is true; and activating the sleep mode of said TAG when said decremented motion count is false, thereby reducing electrical power consumption by said TAG.

2. A method for transmitting data as recited in claim 1, wherein the step of providing a TAG comprises, a battery operated, motion detectable and computer controlled TAG having stored in its memory a plurality of information packets containing selected identifying information for the optical locating system.

3. A method for transmitting data as recited in claim 2, wherein the step of selecting an interval count that is wrappable to define the number of transmissions to the optical locator system.

4. A method for transmitting data as recited in claim 1, further comprising a randomized preselected time delay for offsetting said uplink transmissions.

5. A method of transmitting data and control information contained in a plurality of information packages to an optical receiver in an optical locator system; comprising the following steps:

providing a TAG having a memory and serial interface;

positioning in spaced relation a plurality of memory devices having encoded into their memory selected identifying information;

engaging said TAG's serial interface communicatively and operatively with an individually selected said memory device;

receiving into said TAG's memory said selected information;

forming an uplink information package containing said information packets; and transmitting said uplink information package from said TAG to the optical locator system.

6. A method for transmitting data as recited in claim 5, wherein the step of forming an uplink information package comprises selected information packets.

7. A method for transmitting data as recited in claim 5, wherein the step of providing a TAG comprises, a battery operated computer controlled TAG having a serial interface.

8. A method for transmitting data as recited in claim 5, further comprising the step of receiving said plurality of information packets from said memory devices and storing received packets in said TAG's memory.

9. A method for transmitting data as recited in claim 5, further comprising the step of clicking battery life of said TAG;

storing said checked battery life in said TAG's memory; and forming an uplink information package containing said checked battery life and said information packets.

10. A method of transmitting data as recited in claim 5, wherein the step of engaging said TAG's serial interface further comprises:

transmitting from said TAG to said memory device a protocol requesting said encoded identifying information to be transmitted along said TAG's serial interface;

transmitting from said memory device to said TAG an acknowledgment of the presence of said TAG engaging said memory device;

forming a plurality of information packets within said memory device each containing said identifying information; and transmitting said plurality of information packets to said TAG along said TAG's serial interface.

11. A method of transmitting data and control information contained in a plurality of information packages to an optical receiver in an optical locator system, comprising the following steps:

providing a TAG having a serial data interface for receiving data and identifying information;

forming at least one information packet from said data, said information packet containing selected identifying information for the optical locating system;

selecting a maximum number of transmissions from said TAG to the optical locator system;

selecting a time delay that restricts transmission from said TAG to said selected maximum;

activating a sleep mode of said TAG, thereby reducing the normal electrical power consumption by said TAG;

selecting a terminal time interval for said sleep mode;

reactivating said sleep mode when said selected time delay added to said sleep mode time is greater than said terminal time interval, thereby returning the power level of said TAG to normal;

forming an uplink information package containing said information packets; and transmitting said information package to the optical locating system.

12. A method for transmitting data as recited in claim 11, wherein the step of transmitting said information package is omni-directionally from said TAG to the optical locator system.

13. A method for transmitting data as recited in claim 11, wherein the step of providing a TAG comprises, a battery operated, computer controlled TAG having stored in its memory a plurality of information packets containing selected identifying information for the optical locating system.

14. A method of transceiving data and control information contained in a plurality of information packages to and from an optical transceiver in an optical locator system, comprising the following steps:

providing a TAG having a serial interface;

positioning in spaced relation at plurality of memory devices having encoded in to their memory selected identifying information;

engaging said TAG's serial interface with an individually selected said memory device;

transmitting from said TAG to said memory device a protocol requesting said encoded identifying information to be transmitted along said TAG's serial interface;

forming a plurality of information packets within said memory device each containing said identifying information;

transmitting a polling protocol front the optical locating system to said plurality of TAGs within the optical locating system;

receiving said protocol from the optical locating system and storing said received protocol in said TAG's memory;

identifying a selected identification, code from said protocol selectively identifying said TAG;

comparing said selected identity code with said stored encoded identity unique to said TAG;

forming an uplink information package containing said information packets within said comparison is true; and transmitting said uplink information package to the optical locator system.

*15. A method of transmitting data and control information contained in a plurality of information packages to a receiver in a locator system, comprising the following steps:*

*providing a TAG having a memory and a serial interface;*

*receiving into said TAG's memory selected identifying information through said serial interface;*

*forming an uplink information package containing said information packages; and*

*transmitting said uplink information package from said TAG to the receiver in the locator system.*

*16. The method of claim 15 further comprising the steps of:* changing said selected identifying information.

*17. The method of claim 15, wherein the step of receiving into said TAG's memory further comprises the steps of:*

*transmitting from said TAG to a memory device a protocol requesting encoded identifying information to be transmitted along said TAG's serial interface;*

*transmitting from said memory device to said TAG an acknowledgment of the presence of said TAG enraging said memory device;*

*forming a plurality of information packets within said memory device each containing said identifying information; and*

*transmitting said plurality of information packets to said TAG along said TAG's serial interface.*

*18. The method of claim 15, wherein the step of providing a TAG further comprises the step of providing a TAG having a receiver.*

*19. The method of claim 15, wherein the step of transmitting further comprises the step of optically transmitting in the infrared spectrum.*

*20. The method of claim 15, wherein the step of providing a TAG further comprises the step of providing a TAG having a stored identity code that does not change.*

*21. The method of claim 15, wherein the receiving step further includes the step of receiving from a touch memory device.*

*22. A TAG for a location system comprising:*

*a transmitter for transmitting identifying information;*

*a memory for storing programmable identity information; and*

*a serial interface for receiving new identity information for the memory,*

*wherein the transmitter transmits identifying information including the programmable identity information.*

*23. The TAG of claim 22 further comprising a stored identity code that does not change.*

*24. The TAG of claim 23, wherein the transmitter further transmits the stored identity code.*

*25. The TAG of claim 22, further comprising.*

*a receiver for receiving poll requests for information.*

*26. The TAG of claim 22, wherein the transmitter is an optical transmitter.*

*27. The TAG of claim 26, wherein the optical transmitter transmits in the infrared frequency.*

*28. The TAG of claim 22, wherein the serial interface is a serial interface compatible with touch memory devices.*

* * * * *